A. McMURTRIE.
BUSHING FOR ELECTRICAL CONDUITS.
APPLICATION FILED APR. 25, 1907.
1,122,406.
Patented Dec. 29, 1914.
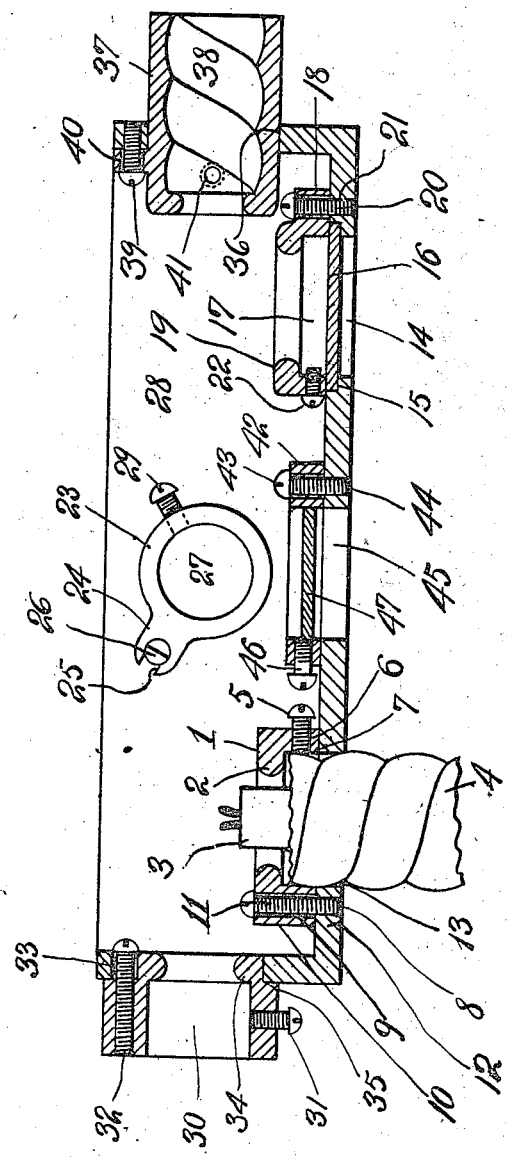
WITNESSES:
A. Konigsberg
R. L. Stilborn
Adnah McMurtrie INVENTOR
BY
Alexander C. Proufit, ATTORNEY

UNITED STATES PATENT OFFICE.

ADNAH McMURTRIE, OF NEW YORK, N. Y., ASSIGNOR TO THOMAS & BETTS COMPANY, OF NEW YORK, N. Y., A CORPORATION OF NEW YORK.

BUSHING FOR ELECTRICAL CONDUITS.

1,122,406.  Specification of Letters Patent.  Patented Dec. 29, 1914.

Application filed April 25, 1907. Serial No. 370,118.

*To all whom it may concern:*

Be it known that I, ADNAH MCMURTRIE, of New York, N. Y., have invented certain Improvements in Bushings for Electrical Conduits, of which the following description, in connection with the accompanying drawings, is a specification, like letters on the drawings designating like parts.

This invention relates to systems of armor for electrical conductors and more particularly to bushings for protecting the ends of the "sheaths" as I term generically the various forms of tubular armor whether formed as a unitary structure with the conductor and its insulation, or having a separate identity, as in "electrical conduits" so-called; this bushing being provided, in accordance with my invention, with means to secure the sheath to an outlet box or similar electrical conduit member and to insure electrical connection therewith, as required by the Board of Fire Insurance Underwriters in the installation of such armor systems.

The various features of my invention will be illustrated and described fully in the accompanying drawing and specification, and set forth in the claim.

In the drawing, the figure illustrates in vertical section an outlet box of a well known type provided with several bushings in the construction of which my improvements have been embodied.

In the embodiment of my invention selected for illustration and description to enable ready and complete understanding of my improvements, the part designated by the reference numeral 1 is a bushing which may be, and preferably is, of annular shape as illustrated, and formed of cast metal, sheet metal, or other suitable and convenient material, having an annular protective shoulder 2 to pass the electrical conductors 3, which are thus prevented from abrasion by the jagged end of the sheath, the latter being illustrated in this instance as a well-known form of flexible armored conductor.

Suitable means to secure the bushing and sheath together are provided in accordance with my invention, and in the instance illustrated these improvements take the form of a set screw 5 passing through a threaded aperture 6 in the shank 7 of the bushing, a firm attachment being thus secured with perfect electrical connection with the sheath. Suitable means are also provided to secure mechanical and electrical connection between the bushing and the outlet box, and these means may be of any suitable and convenient form, preferably analogous to the set screw 5, for the sake of uniformity in construction of the bushing. Accordingly, I have shown a screw 11 passing through a seat 9 in the shank portion 10 of the bushing and entering the threaded hole 8 in the bottom wall 12 of the box adjacent the aperture 13 which in the instance illustrated is the usual plain, round hole common to boxes of this type.

The bushing thus illustrated constitutes a very simple, inexpensive and efficient form of mechanical and electrical connection for the parts joined, and of protection for the conductor; and I will now describe several modifications in the arrangement of parts.

At 14 I have shown a conduit aperture in the bottom wall of the box, which has a ledge 15 to receive the closure disk 16, which is held in place in the instance illustrated by a bushing 17 provided with an attaching lug 18 slightly lower than the top of the protective shoulder 19 and having an attaching screw 20 seated in a threaded hole 21 in the base of the box. A set screw 22 is provided in the shank of the bushing, as mentioned with reference to the bushing already described, to enable attachment to a conduit.

The box may be furnished with a disk 16 held in place by the bushing 17 and when the disk is to be removed for insertion of a conduit through the aperture 14 the bushing may be removed temporarily, the disk 16 taken out and the conduit inserted, the bushing being secured in place upon the conduit by the screw 22 and the whole secured to the box bottom by the screw 20.

Upon the rear wall of the box I have shown a bushing 23, similar in essential details to the bushing 1 already described, and having a lug 24 with an open slot 25 which may be inserted under the head of the attaching screw 26, the conduit being introduced through the aperture 27 of the rear wall 28 and secured to the bushing by the set screw 29.

The reference numeral 30 designates a bushing designed for use upon the exterior of the box, having as already described a set screw 31 for attachment to the conduit and an attaching screw 32 seated in the aperture 33 in the side wall of the box, a protective annular shoulder 34 being provided upon the bushing, and preferably of somewhat less diameter than the shank of the bushing so that the shoulder can fit snugly within the box aperture 35.

This bushing has the advantage of being substantially flush with the wall and may be used when as much as possible of the space in the box needs to be utilized.

On the opposite wall of the box, in an aperture 36, I have shown the bushing 37 provided with an internal thread 38 corresponding to the peripheral contour of the end of the flexible sheath shown at 4, the bushing being secured to the side wall by a set screw 39 passing through a lug 40. A set screw 41 is also provided for additional means of attachment between the bushing and said sheath end.

In the center of the bottom wall of the box, I have shown the top of bushing 42 unprovided with a protective shoulder but of annular form and having an attaching screw 43 to be seated in a threaded aperture 44 adjacent to the central box aperture 45, through which it is usual to pass a gas pipe, a set screw 46 being provided for attachment of the bushing to the inclosed pipe.

To close the aperture when a pipe is not used the bushing may be provided normally with the closure disk 47 held in place by the set screw 46.

Having illustrated and described my invention thus fully and convenient means for carrying the same into effect, it will be understood that I do not limit myself to the specific materials or forms of construction, nor in general otherwise than as set forth in the claim read in connection with this specification.

What I claim and desire to secure by Letters Patent is:—

As an article of manufacture, a bushing for the purpose set forth, having an aperture to receive an armor sheath at times, and a closing device at times, a set screw carried by said bushing to secure said sheath and closing device therein, and a closing device secured removably in place by said set screw, said bushing having also a binding screw to secure it in place when applied to an electrical conduit member, substantially as described.

Signed at New York, in the county and State of New York, this sixteenth day of April, 1907.

ADNAH McMURTRIE.

Witnesses:
 ALEXANDER C. PROUDFIT,
 HOBART D. BETTS.